United States Patent [19]
Ramsay et al.

[11] Patent Number: 5,290,768
[45] Date of Patent: Mar. 1, 1994

[54] WELAN GUM-ETHYLENE GLYCOL INSULATING COMPOSITIONS

[75] Inventors: A. Michael Ramsay, Escondido; Gail Trimble, San Diego, both of Calif.; James M. Seheult, Houston, Tex.; Michael S. O'Brien, Elcajon, Calif.

[73] Assignee: Merck & Co., Inc., Rahway, N.J.

[21] Appl. No.: 643,872

[22] Filed: Jan. 18, 1991

[51] Int. Cl.$^5$ .................... C07G 17/00; C08B 37/00; A01N 43/04; A61K 31/715
[52] U.S. Cl. ..................... 514/54; 536/114; 106/208; 527/303; 252/99
[58] Field of Search ............... 514/54; 536/114; 252/99; 435/198, 252.1; 122/456; 137/599; 106/208, 729; 166/270; 527/303

[56] References Cited

U.S. PATENT DOCUMENTS

| | | | |
|---|---|---|---|
| 4,342,866 | 8/1982 | Kang et al. | 536/119 |
| 4,792,415 | 12/1988 | Colegrove | 536/114 |
| 4,963,668 | 10/1990 | Allen et al. | 536/114 |
| 4,981,520 | 1/1991 | Hoskin et al. | 536/114 |

FOREIGN PATENT DOCUMENTS

0467635A2  1/1992  European Pat. Off. .

OTHER PUBLICATIONS

Carbohydrate Research, 139 (1985) 217-223 Elsevier Science Publishers B.V., Amsterdam, Per-Erik Jansson.
Carbohydrate Research, 149 (1986) 425-432 Elsevier Science Publishers Amsterdam, Vittoria Crescenzi.
Carbohydrate Research, 160 (1987) 283-302 Elsevier Science Publishers B.V., Amsterdam, Vittorio Crescenzi.

Primary Examiner—Michael G. Wityshyn
Assistant Examiner—Louise N. Leary
Attorney, Agent, or Firm—Richard S. Parr; Melvin Winokur; Paul Matukaitis

[57] ABSTRACT

An ethylene glycol composition containing a glycol-compatible welan gum having unique viscosity and thermal properties. The composition is especially suitable as an insulation material.

7 Claims, 1 Drawing Sheet

WELAN GUM-ETHYLENE GLYCOL INSULATING COMPOSITIONS

BACKBROUND OF THE INVENTION

The transportation of oil obtained from offshore fields requires specially designed systems for conveyance of the oil. Typically, oil temperature is about 220°-250° F. and the temperature of the water through which the oil must be conveyed can be as low as 32°-50° F. Any system for conveying oil through such a low temperature environment must provide a suitable means for insulating the oil from the low temperature.

Failure to provide adequate insulation results in oil temperature reduction and consequential separation of the various hydrocarbon fractions present in the oil, e.g. low viscosity hydrocarbons, medium viscosity hydrocarbons, oil sludge, etc.

One conveying system which is used provides an insulated pipeline bundle through which oil flows. The pipeline bundle rests inside a carrier pipe. The exterior surface of each pipe in the pipeline bundle faces the interior surface of the carrier pipe, and a series of support structures inside the carrier pipe is used to position the pipeline bundle. Generally, extruded foams and insulation wrappings are used to insulate flow lines. Thermal insulation of the flowline pipes is achieved using pre-formed insulation cladding or annular injection of foam. With multiple flow lines, the cost of applying insulation to each line during placement at sea is high. Insulation application must therefore be done at the fabrication site. The use of extruded foams during placement at sea is an unacceptable alternative due to high pressures and gas compressibility.

Jansson et al., *Carbohydrate Research* 139 (1985) 217-223 describes the polysaccharide structure of S-130. The acid hydrolysate of heteropolysaccharide S-130 was described as containing glucose, rhamnose and mannose in relative proportions 43:46:11.

Crescenzi et al., *Carbohydrate Research* 149 (1986) 425-432 describes the behavior of gellan gum (S-60) and of welan gum (S-130) in dilute aqueous solutions.

Crescenzi et al., *Carbohydrate Research* 160 (1987) 283-302 describes the influence of side-chains on the dilute-solution properties of three bacterial anionic polysaccharides, including heteropolysaccharide S-130.

It is a purpose of the present invention to provide a thixotropic composition which serves as an insulating material.

SUMMARY OF THE INVENTION

The present invention is a thixotropic composition containing ethylene glycol and glycol-compatible welan gum. The amount of glycol-compatible welan gum useful in this composition is that which viscosifies ethylene glycol to the point of eliminating convection flow. The composition is used as a convenient insulation material for maintaining high oil temperature during conveyance within a pipe located in a relatively low temperature environment such as sea water.

DETAILED DESCRIPTION OF THE INVENTION

Figure 1:
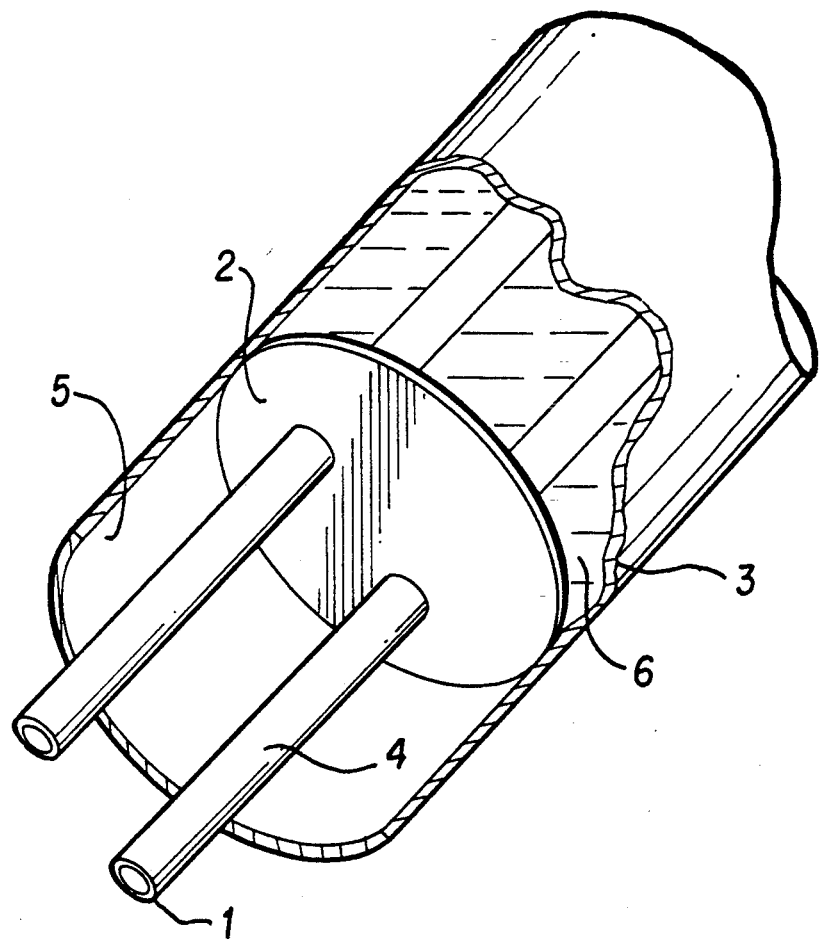
FIG. 1 shows a perspective cross-sectional view of a system for containing and transporting a fluid.

The present invention provides a thixotropic composition having advantageous flow properties as well as insulating capabilities. The composition comprises industrial grade ethylene glycol and glycol-compatible welan gum. Throughout the description, the composition will be referred to interchangeably as a thixotropic composition or as a viscosified glycol composition.

In a quiescent state, thixotropic compositions act as Bingham plastics. When subjected to shear stresses, however, thixotropic compositions quickly fluidize. Upon cessation of the applied shear stress, thixotropic compositions quickly revert to the highly viscous/Bingham plastic state.

Optionally, a metal sequestrant is present in an amount sufficient for minimizing deleterious effects caused by the presence of metal ions.

The insulation composition of the present invention provides efficient thermal insulation which is convenient to use in instances where extruded foams and insulation wrappings are either difficult or impossible to use.

The insulation capacity of the composition is such that either longer sea bed lines or slower production rates through shorter lines is possible while end line minimum oil temperatures are maintained.

The insulating composition is also advantageous because the miscibility of glycol in water and the compatibility of the gum with glycol and water allow the composition to tolerate a high degree of sea water invasion. Furthermore, the miscibility of glycol in water ensures that no lasting detrimental effects to the environment will result in the event of spillage.

The composition also aids in ballasting of pipe bundles. Conventional insulation materials such as extruded foams and insulation wrappings, which are low density materials, do not provide such stability.

With regard to temperature related stability, the composition is much more stable than kerosene based fluids, laminates and foams. The composition is also useful as a thickened de-icing and anti-icing fluid, especially for aircraft and other machinery that needs to be kept free of ice build-up in freezing weather.

In addition to the use described above, the thixotropic rheological properties of the composition make it suitable for use as an oil well insulating packer material, a ballast material, a non-petroleum based hydraulic material for motor actuating cylinders and a reservoir work over completion "kill" material.

Preferably, compositions of the present invention include those comprising weight ratios of glycol:glycol-compatible welan gum of between 100:1 and 300:1, more preferably 150:1 and 250:1, even more preferably 175:1 and 225:1 and even more preferably 180:1 and 220:1. Most preferably, the weight ratio is about 195:1.

More preferably, compositions of the present invention additionally comprise a metal sequestrant in an amount between 500 ppm and 2000 ppm, preferably 1250 ppm. A preferred sequestrant is EDTA.

FIG. 1 shows a perspective cross-sectional view of a system for containing and transporting a fluid. The system comprises one or more subject fluid pipes 1 extending through and contacting a series of supports 2; carrier pipe 3 contacting supports 2, whereby the exterior surface or surfaces 4 of subject fluid pipe or pipes 1 oppose interior surface 5 of carrier pipe 3; and chamber 6 between exterior surface or surfaces 4 of subject fluid pipe 1 and interior surface 5 of carrier pipe 3.

In the system of the present invention, viscosified ethylene glycol containing glycol compatible welan gum, is introduced to chamber 6. The viscosified glycol's thixotropic rheological property makes it suitable, under shear stress, for introduction to the chamber as a pumpable liquid material. When the viscosified glycol substantially fills the chamber and is under minimal or no shear stress, it rests as a Bingham plastic. The material rests within carrier pipe 3 and surrounds subject fluid pipes 1, contacting supports 2 and surfaces 4 and 5.

The viscosified glycol is useful in a method for transporting a subject fluid through a lower temperature environment surrounding the subject fluid, wherein the subject fluid pipe, extending through a carrier pipe and forming a chamber between the exterior surface of the subject fluid pipe and the interior surface of the carrier pipe, is insulated from the lower temperature environment, which comprises introducing the viscosified glycol into the chamber.

The subject fluid for which the above described system is especially useful is oil obtained from undersea oil wells. Such oil, naturally having a temperature greater than that of the sea, is insulated from the lower sea temperature and retains its naturally elevated temperature as it flows through fluid pipe 1.

Kang et al., U.S. Pat. No. 4,342,866 describes a procedure for making welan gum. Welan gum describes an industrial grade of a microbial polysaccharide produced by the growth of the Alcaligenes strain ATCC 31555 in a pure culture fermentation using carbohydrates as a carbon source. The product is recovered from the fermentation broth by precipitation with alcohol. Welan gum is a polysaccharide gum which comprises principally a heteropolysaccharide containing the neutral sugars D-glucose, D-glucuronic acid, L-rhamnose and L-mannose and glycosidically linked acetyl ester groups. The structure of this polysaccharide is described in Jansson P. E., Lindberg B, and Widmalm G (1985) *Carbohydrate Research* 139, 217-223.

Preparation of glycol-compatible welan gum

Glycol-compatible welan gum is prepared by the procedure described in U.S. Pat. No. 4,342,866. After fermentation, the broth is treated with sodium hypochlorite and calcium propionate followed by precipitation, drying and milling. A preferred process for preparing glycol-compatible welan gum useful in the present invention involves modification of the recovery process. The modification involves addition of sodium sulfate or potassium sulfate, preferably sodium sulfate, after fermentation and prior to precipitation. Preferably, 0.1-1.0 wt. %, more preferably 0.3-0.7, and even more preferably 0.45 wt. % of sodium sulfate, is added to the fermentation broth.

Description of the strains used for producing glycol-compatible welan gum

A. Characteristics of Colonial Morphology

On nutrient agar, small yellow colonies appear in one day at 30° C. with the diameter reaching about 1.5 mm after 5 days' incubation. The colonies are round, smooth, convex, mucoid, and opaque. The yellow color becomes more deep and the texture of colonies becomes hard after prolonged incubation.

On YM agar, small mucoid yellow colonies appear in one day and the diameter reaches about 3 mm after 5 days' incubation. The colonies are round, smooth, convex, and opaque, but the top of the colonies are flat. No membraneous hard texture is observed.

B. Characteristics of Cell Morphology

Strain S-130 is a gram-negative rod-shaped bacterium. On nutrient agar the average size of the cell is about 0.5-0.6 by 1.2-1.6 $\mu$m; ends of the cells are tapered and curvature was often seen. The size and shape of the cells do not change significantly after prolonged incubation.

On YM agar the average cell size is 0.6-0.8 by 1.6-2.0 $\mu$m, but the cell becomes longer (3-4 $\mu$m); accumulation of PHB is significant. Motility is positive. Flagella stains (modified silver nitrate method) show that the strain has mixed flagellation, i.e., polar and lateral flagella, as well as peritrichous flagella.

C. Physiological and Biochemical Characteristics

The following are results of tests employed:

Cytochrome oxidase is weak or negative; catalase positive.

Organism is capable of growth at 37° C. and 41° C., but not at 43° C.

Tolerance to 3.0% NaCl, but not to 6.5% NaCl.

Growth at pH between 5 and 12.

Aerobic acid but not gas was produced from various carbohydrates, such as:

| | |
|---|---|
| D-xylose | lactose |
| L-arabinose | maltose |
| D-glucose | melibiose |
| fructose | sucrose |
| galactose | trehalose |
| mannose | raffinose |

Litmus milk was reduced, but not peptonized.

ADH was positive, but not LDC, ODC, and PDA.

MR was positive, but negative for VP, indole, and urease.

Esculin gelatin (weak) and Tween 80 (weak) were hydrolyzed, but not casein, starch, cellulose, pectin.

No phosphatase, and haemolysis negative.

0.1% triphenyltetrazolium chloride was not inhibitory.

Survival at 60° C. for 30 minutes.

Organisms grow on EMB agar and Tellurite Blood, but not on SS and MacConkey agar.

D. Antibiotic Susceptability Test

The strain S-130 is susceptible to the following antibiotics.

| | |
|---|---|
| Kanamycin | 30 $\mu$g |
| Neomycin | 30 $\mu$g |
| Chlortetracycline | 5 $\mu$g |
| Novobiocin | 30 $\mu$g |
| Erythromycin | 15 $\mu$g |
| Tetracycline | 30 $\mu$g |
| Gentamicin | 10 $\mu$g |
| Carbenicillin | 50 $\mu$g | and not susceptible to:

| | |
|---|---|
| Penicillin | 10 units |
| Streptomycin | 10 $\mu$g |
| Colistin | 10 $\mu$g |
| Polymyxin B | 300 units |

E. Nutritional Characteristics

Organic growth factors are not required and ammonium salts serve as the sole nitrogen source. A total of 30 organic compounds are utilized as sole source of carbon and energy. Most carbohydrates are utilized.

F. G+C Content of the DNA

No DNA analysis was performed.

G. Identification by API System

The strain could not be identified by this system.

H. Identification

The strain S-130 is a gram-negative aerobic rod-shaped organism. The mode of flagellation of the organism is mixed; polar and peritrichous flagella (possibly degenerate flagella) are seen. According to Bergey's Manual (8th Edition), such organisms belong as a member of the genus Alcaligenes.

TABLE I

Biochemical and Other Miscellaneous Tests Employed for the Strain S-130

| | |
|---|---|
| Oxidase: | |
| Kovac's | + (weak) |
| Pathotech | + (weak) |
| Catalase | + |
| OF medium: | |
| Oxidative | + |
| Fermentative | − |
| Gas from glucose | − |
| H₂S production | − |
| TSI from cystine | ± |
| Ammonium from peptone | NT |
| β-Galactosidase (ONPG) | + |
| Argnine dihydrolase | + |
| Lysine decarboxylase | − |
| Ornithine decarboxylase | − |
| Tryptophan deaminase | NT |
| Phenylalanine deaminase | − |
| Urease | − |
| Indole | − |
| MR test | + |
| VP test | − |
| Nitrate reduction | − |
| Nitrite reduction | − |
| Denitrification | NT |
| N₂-fixation: | |
| Growth in Burk's medium | + |
| Nitrogenase activity | NT |
| Malonate (oxidation) | − |
| Phosphatase | − |
| Haemolysis (sheep blood) | − |
| Litmus milk: | |
| acid, reduction only | − |
| 3-ketolactose production | |
| Survival at 60° C. for 30 min. | + |
| TSI: | |
| Slant | Acid |
| Butt | No growth |
| Gas | − |
| Egg Yolk Reaction | − |
| Hydrolysis of: | |
| Gelatin | + (weak) |
| Casein | − |
| Starch | − |
| Tween 80 | + (weak) |
| Pectin | − |
| Alginate | NT |
| Cellulose | − |
| Chitin | − |
| DNA | NT |
| Esculin | + |
| Growth on various media: | |
| EMB agar | + |
| MacConkey agar | − |
| SS agar | − |
| Mannitol salt agar | − |
| TCBS agar | − |
| Tinesdale tellurite blood agar | + |

TABLE I-continued

Biochemical and Other Miscellaneous Tests Employed for the Strain S-130

| | |
|---|---|
| Pseudosel agar | NT |
| Pigment production: | |
| King A medium | − |
| King B medium | − |
| Dye reaction: | |
| Congo red | − |

+ = positive
− = negative
NT = not tested

Fermentation conditions

Heteropolysaccharide is produced during the aerobic fermentation of suitable aqueous nutrient media under controlled conditions via inoculation with the organism of the unnamed Alcaligenes species. The media contain sources of carbon, nitrogen and inorganic salts.

In general, carbohydrates (for example, glucose, fructose, maltose, sucrose, xylose, mannitol and the like) can be used either alone or in combination as sources of assimilable carbon in the nutrient medium. The exact quantity of the carbohydrate source or sources utilized in the medium depends in part upon the other ingredients of the medium but, in general, the amount of carbohydrate usually varies between about 2% and 4% by weight of the medium. Preferably 3% glucose is used. These carbon sources can be used individually, or several such carbon sources may be combined in the medium. In general, many proteinaceous materials may be used as nitrogen sources in the fermentation process. Suitable nitrogen sources include, for example, yeast hydrolysates, primary yeast, soybean meal, cottonseed flour, hydrolysates of casein, corn steep liquor, distiller's solubles or tomato paste and the like. The sources of nitrogen, either alone or in combination, are used in amounts ranging from about 0.05% to 0.4% by weight of the aqueous medium.

Among the nutrient inorganic salts which can be incorporated in the culture media are the customary salts capable of yielding sodium, potassium, ammonium, calcium, phosphate, sulfate, chloride, carbonate, and the like ions. Also included are trace metals such as cobalt, manganese, iron and magnesium.

It should be noted that the media described in the examples are merely illustrative of the wide variety of media which may be employed, and are not intended to be limitative.

As an alternative medium, S-130 may be grown under low Ca++ conditions, i.e., in deionized water, or some other aqueous system substantially free of Ca++ ions (i.e., less than about 4 ppm Ca++ per 1% gum in the final fermentor broth).

The fermentation is carried out at temperatures ranging from about 25° C. to 35° C.; however, for optimum results it is preferable to conduct the fermentation at temperatures of from about 28° C. to 32° C. The pH of the nutrient media for growing the Alcaligenese culture and producing the polysaccharide S-130 can vary from about 6 to 8, preferably 6.5 to 7.5.

Although the polysaccharide is produced by both surface and submerged culture, it is preferred to carry out the fermentation in the submerged state.

A small scale fermentation is conveniently carried out by inoculating a suitable nutrient medium with the culture, and after transfer to a production medium permitting the fermentation to proceed at a constant temperature of about 30° C. on a shaker for several days.

The fermentation is initiated in a sterilized flask of medium via one or more stages of seed development. The nutrient medium for the seed stage may be any suitable combination of carbon and nitrogen sources. The seed flask is shaken in a constant temperature chamber at about 30° C. for 1-2 days, or until growth is satisfactory, and some of the resulting growth is used to inoculate either a second stage seed or the production medium. Intermediate stage seed flasks, when used, are developed in essentially the same manner; that is, part of the contents of the flask from the last seed stage are used to inoculate the production medium. The inoculated flasks are shaken at a constant temperature for several days, and at the end of the incubation period the contents of the flasks are recovered by precipitation with a suitable alcohol such as isopropanol.

For large scale work, it is preferable to conduct the fermentation in suitable tanks provided with an agitator and a means of aerating the fermentation medium. According to this method, the nutrient medium is made upin the tank and sterilized by heating at temperatures of up to about 121° C. Upon cooling, the sterilized medium is inoculated with a previously grown seed of the producing culture, and the fermentation is permitted to proceed for a period of time as, for example, from 2 to 4 days while agitating and/or aerating the nutrient medium and maintaining the temperature at about 30° C. This method of producing the heteropolysaccharide is particularly suited for the preparation of large quantities.

Post-fermentation

Preferably, after fermentation, and prior to product recovery from fermentation medium, potassium sulfate or sodium sulfate is added to the fermentation medium. Addition of about 0.1-1.0 wt. % of the broth of potassium sulfate or sodium sulfate is critical for obtaining glycol-compatible welan gum. The glycol-compatible welan gum so obtained possesses hydrating properties essential for forming the insulation fluid of the present invention.

Analysis

Glucuronic acid was identified by using the method of Bhatti et al., *Biochim. Biophys. Acta* 22 (1970) 339-347. Absolute configurations of the sugars were determined by the methods devised by Gerwig et al., *Carbohydrate Research* 77 (1979) 1-7, and by Leontein et al., *Carbohydrate Research* 62 (1978) 359-362.

Methylation analyses were performed essentially as described in Jansson et al., *Chem. Common. Univ. Stockholm*, 8 (1976) 1-75. Methylated polymers were recovered by dialysis against water, followed by freeze-drying. Low-molecular-weight products were recovered by reversed phase chromatography on Sep-Pak $C_{18}$ cartridges, Waeghe et al., *Carbohydrate Research* 123 (1983) 281-304. The sample was diluted with an equal volume of water and applied to the column. This was washed with water and acetonitrile-water (15:85), and the sample was eluted with acetonitrile.

Carboxyl-reduction of methylated polysaccharide

The methylated polysaccharide (1.5 mg) was dissolved in freshly distilled tetrahydrofuran (2 mL). Lithium borohydride (10 mg) was added and the solution boiled under reflux for 2 hours. Excess of lithium borohydride was decomposed with M acetic acid, chloroform (5 mL) was added, and the solution was washed several times with water, dried, and concentrated.

Uronic acid-degradation

To a solution of the methylated polysaccharide (1.5 mg) in dimethyl sulfoxide (1.5 mL) were added a trace of toluene-p-sulfonic acid and 2,2-dimethoxypropane (0.1 mL) in order to eliminate any water present. Sodium methylsulfinylmethanide in dimethyl sulfoxide (2M, 1 mL) was added, and the mixture was agitated in an ultrasonic bath for 30 minutes and kept at room temperature for 15 hours. Trideuteriomethyl iodide (0.5 mL) was added with external cooling and the mixture agitated in the ultrasonic bath for 30 minutes. The excess of methyl iodide was removed by flushing with nitrogen, and the solution was diluted with water and added to a Sep-Pak $C_{18}$ cartridge. The material was recovered as described above. The product was hydrolyzed with 2M trifluoracetic acid for 15 hours at 100° C. and the mixture of methylated products was analyzed (Table II, column C).

Approximately 50% of the glycol-compatible welan gum polysaccharide units contain an O-acetyl group. An acid hydrolysate of the fermented polysaccharide contained glucose, rhamnose and mannose in the relative proportions 43:46:11. It further contained glucuronic acid, identified by g.l.c. of a sample that had been methanolyzed and trimethylsilylated using the procedure described by Bhatti et al.

Absolute configurations of component sugars were determined by g.l.c. of the glycosides obtained on solvolysis with chiral 2-butanol followed by trimethylation, as devised by Gerwig et al. The glucose and glucuronic acid have the D configuration and the rhamnose has the L configuration. The mannose has the L configuration. This was confirmed by g.l.c. of the glycosides obtained on solvolysis with chiral 2-octanol followed by acetylation, as devised by Leontein et al.

Methylation analysis without and with carboxyl-reduction of the methylated polysaccharide, gave the products listed below, columns A and B respectively.

TABLE II
METHYLATION ANALYSIS OF THE POLYSACCHARIDE AND SOME DEGRADATION PRODUCTS[a]

| Sugar[b] | T[c] | Mole % | | | | |
|---|---|---|---|---|---|---|
| | | A | B | C | D | E |
| 1,2,3,5-Rhamnitol | 0.38 | | | | 13 | 22 |
| 2,3,4-Rha | 0.59 | 12 | 7 | 16 | | |
| 2,3-Rha | 0.94 | 26 | 21 | 18 | | |
| 2,3,4,6-Glc | 1.00 | | | | 54 | 36 |
| 2,3,4,6-Man | 1.00 | 10 | 7 | 19 | | 5 |
| 2,4,6-Glc | 1.67 | 26 | 23 | 43[d] | | |
| 2,3,6-Glc | 1.92 | | | | 33 | 34 |
| 2,6-Glc | 2.79 | 26 | 23 | 4 | | 3 |
| 2,3-Glc | 3.56 | | 19 | | | |

[a]Key: A, methylated polysaccharide; B, methylated and carboxyl-reduced polysaccharide; C, uronic acid-degraded polysaccharide; D, acidic tetrasaccharide; E, acidic penta- and tetra-saccharide.
[b]2,3,4-Rha = 2,3,4-tri-O-methyl-L-rhamnose, etc.
[c]Retention time of the corresponding alditol acetate, relative to 1,5-di-O-acetyl-2,3,4,6-tetra-O-methyl-D-glucitol on an SP-1000 glass-capillary column at 200° C.
[d]>90% Trideuteriomethyl at 0-4.

In order to determine the sequence of the sugar residues, the glycol-compatible welan gum polysaccharide was subjected to a uronic acid-degradation (Lindberg et al. *Carbohydrate Research* 28 (1973) 351-357 and Aspinall et al. *Carbohydrate Research* 57 (1977) c23-c26). The fully methylated polysaccharide was treated with sodium methylsulfinylmethanide in dimethyl sulfoxide, methylated (using trideuteriomethyl iodide), and hydrolyzed, and the mixture of methylated sugars was analyzed (Table II, column C). 2,6-di-O-methyl-4-O-trideuteriomethyl-D-glucose was derived from the branching D-glucopyranosyl residue, the 4-position of which was liberated on degradation of the uronic acid. The 3-substituted D-glucopyranosyl residue linked to 0–4 of the uronic acid was released by $\beta$-elimination and further degraded by $\beta$-elimination, with release of the 4-substituted L-rhamnopyranosyl residue. A considerable part of this residue was also degraded.

EXAMPLE 1

Fermentation Procedure for Producing Glycol-Compatible Welan Gum

A. Culture Maintenance

The unnamed Alcaligenes organism, ATCC 31555, grows quite well on NA agar, with good colonial morphology. The incubation temperature is 30° C. The organism produces a yellow pigment.

B. Seed Preparation

Flask seeds are prepared in YM broth incubated at 30° C. for 24 hours, then used to inoculate seed medium which is the same as final fermentor medium. A 5% inoculum is used for a 14 L fermentor.

C. Final Fermentor Medium

The following medium gives acceptable results in the 14 L fermentor and can be used for larger scale 20 L and 70 L fermentors:

| | |
|---|---|
| Glucose | 3.0% |
| K$_2$HPO$_4$ | 0.05% |
| Promosoy | 0.05% |
| NH$_4$NO$_3$ | 0.09% |
| MgSO$_4$7H$_2$O | 0.01% |
| Fe++ | 1 ppm |
| HoLe salts | 1 ml/L |

The pH is controlled between 6.5 and 7.5. At 0 hours, pH is 7.3 and residual carbon source was measured to be 3.07%. After 25.5 hours, pH was 7.0 and beer viscosity measured 2350 (Brookfield LVF, 60 rpm, spindle 4). After 63.5 hours, pH was 6.3 and beer viscosity 3950, and the reaction is terminated by adding 4% isopropanol.

Hole salts is a trace element solution containing tartrate, magnesium molybdate, CoCl$_3$, ZnCl$_2$, CuCl$_2$, boric acid, manganese chloride and ferrous sulfate.

The initial agitation and aeration rates were 400 r.p.m. and 3 L/M, respectively. The aeration remained constant throughout the fermentation. The agitation was increased as necessary during the fermentation to ensure good mixing. Maximum agitation was 1600 r.p.m.

When a low calcium product is desired, the medium above is used with deionized water.

D. Sodium Sulfate Addition

Sodium sulfate is added to the fermentation product at 0.45 wt. % relative to the weight of the fermentation broth.

E. Recovery

Fermentation beer is pasteurized at 167° F. for 10–15 minutes. Good fibers are produced under precipitation conditions giving 58–60% spent IPA.

F. Drying

Product is recovered after drying at 50°–55° C. for about one hour in a forced-air tray dryer.

The product exhibited high viscosity in ethylene glycol. A 0.25% mix in ethylene glycol, measured at 6 rpm with a Brookfield LVT, had viscosity greater than 2,500 cP. At that concentration, it has an elastic modulus value of greater than 50 dynes/cm$^2$.

Glycol-compatible welan gum has a thick gel-like appearance. Hydration of glycol-compatible welan gum in pure ethylene glycol is completed after 2 hours of mixing and another 18 hours of standing at room temperature. The rate of hydration is increased with the use of heat or when the ethylene glycol is mixed with increasing amounts of water. In pure cold water, complete hydration is achieved in about one hour or less.

Ethylene glycol- glycol-compatible welan gum blends show great stability (no viscosity loss over a period greater than one year).

EXAMPLE 2

Insulating Composition 2 lbs of glycol-compatible welan gum was combined with 390 lbs ethylene glycol. 1250 ppm EDTA is added as a sequestrant. The composition was hydrated on an Oster blender stirring at 10,000+ rpm for 20 minutes. The composition is non-polluting to marine life up to 200,000 ppm.

The composition was tested for thermal conductivity and shown to be superior to several alternative insulating materials:

| | Thermal Conductivity (Watts/m) |
|---|---|
| Gelled Insulating Composition (Example 2) | 91 |
| Liquid Ethylene glycol | 4022 |
| Nitrogen @ atm. pressure | 162 |
| Nitrogen @ 10 atm. | 436 |
| Nitrogen @ 30 atm. | 729 |

EXAMPLES 3–10

Following the procedure described in Example 2, the following compositions, containing two pounds glycol-compatible welan gum, 1250 ppm EDTA and various amounts of ethylene glycol, are prepared.

| Example No. | Ethylene Glycol (lbs) |
|---|---|
| 3 | 200 |
| 4 | 300 |
| 5 | 350 |
| 6 | 360 |
| 7 | 440 |
| 8 | 450 |
| 9 | 500 |
| 10 | 600 |

The compositions described in Example 3–10 showed varying degrees of thixotropic properties of the composition described in Example 2. The composition in Example 3 retains a high degree of viscosity, and although its thermal conductivity is suitable, it is less convenient to manipulate for certain purposes, such as for the oil insulation purpose described above. The composition of Example 10 is easier to manipulate than the composition described in Example 2, but its thermal conductivity is more like pure ethylene glycol.

EXAMPLE 11

Another Fermentation Procedure for Producing Glycol-Compatible Welan Gum

A. Culture Maintenance

The unnamed Alcaligenes organism, ATCC 31555 grows quite well on nutrient agar. The incubation temperature is 30° C. the organism produces a yellow pigment.

B. Seed Preparation

Flask seeds are prepared in YM broth incubated at 30° C. for 24 hours with shaking. Fresh YM broth seeds are then started using a 1% inoculum. After 24 hours incubation at 30° C. with shaking these YM seeds are used to inoculate a one-gallon fermentor containing a seed medium which is the same as the final fermentor medium except that it contains 0.5% $K_2HPO_4$. The inoculum size is 6.7% and the fermentation temperature is 30° C. The air flow rate is one L/M and the agitation is set at 400 RPM. At 25 hours this seed was used to start a 30 L fermentor with an inoculum size of 5%.

C. Final Fermentor Medium

The following medium gives acceptable results in the 30 L fermentor and can be used for larger scale fermentors such as 70 L.

| | |
|---|---|
| Glucose | 3.0% |
| $K_2HPO_4$ | 0.05% |
| Promosoy | 0.05% |
| $NH_4NO_3$ | 0.09% |
| $MgSO_4 7H_2O$ | 0.01% |
| Fe++ | 1 ppm |
| HoLe salts | 1 ml/L |

The pH is controlled between 6.5 and 7.5. At 0 hours, the residual carbon source was measured to be 3.08%. At 69 hours, the pH was 6.55 and the beer viscosity was 42,500 cP.

Hole salts is a trace element solution containing tartrate, magnesium molybdate, $CoCl_3$, $ZnCl_2$, $CuCl_2$, boric acid, manganese chloride and ferrous sulfate.

The initial agitation and aeration rates were 300 rpm and 5 L/M, respectively. The aeration rate was increased to 10 L/M at 20 hours and then remained constant through the fermentation. The agitation was increased to 700 RPM (maximum) at 20 hours.

When a low calcium product is desired, the medium above is used with deionized water.

D. Sodium Sulfate Addition

Sodium sulfate is added to the fermentation product at a weight % of 1.0% relative to the weight of the broth.

E. Recovery

Fermentation beer is pasteurized at 167° F. for 10–15 minutes. Good fibers are produced under precipitation conditions giving 58–60% spent IPA.

F. Drying

Product is recovered after drying at 50°–55° C. for about one hour in a forced air tray dryer.

This product has been demonstrated to have thermal and solution properties similar to the sample described in the Example 1.

What is claimed is:

1. A thixotropic composition consisting essentially of ethylene glycol, a chelating agent, and glycol-compatible welan gum, wherein the glycol-compatible welan gum, in a 0.25% mixture with ethylene glycol, measured at 6 rpm with a Brookfield LVT, at room temperature and cylindrical spindle #4, has a viscosity greater than about 2,500 cP.

2. A composition of claim 1 wherein the glycol and glycol-compatible welan gum are present in a weight ratio of between about 100:1 and 300:1.

3. A composition of claim 2 wherein the ratio is between about 150:1 and 250:1.

4. A composition of claim 3 wherein the ratio is between about 175:1 and 225:1.

5. A composition of claim 4 wherein the ratio is between about 180:1 and 220:1.

6. A composition of claim 5 wherein the ratio is about 195:1.

7. A composition of claim 1 wherein the chelating agent is EDTA present in an amount of between about 500 ppm and 2000 ppm.

* * * * *